US009719570B2

(12) United States Patent
Kojima

(10) Patent No.: US 9,719,570 B2
(45) Date of Patent: Aug. 1, 2017

(54) VIBRATION-DAMPING DEVICE

(71) Applicant: YAMASHITA RUBBER CO., LTD., Fujimino, Saitama (JP)

(72) Inventor: Shigeo Kojima, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 0 days.

(21) Appl. No.: 14/439,418

(22) PCT Filed: Oct. 29, 2013

(86) PCT No.: PCT/JP2013/079223
§ 371 (c)(1),
(2) Date: Apr. 29, 2015

(87) PCT Pub. No.: WO2014/069441
PCT Pub. Date: May 8, 2014

(65) Prior Publication Data
US 2015/0300436 A1    Oct. 22, 2015

(30) Foreign Application Priority Data
Nov. 2, 2012 (JP) ................ 2012-242995

(51) Int. Cl.
*F16M 1/00* (2006.01)
*F16F 1/387* (2006.01)
*F16F 1/371* (2006.01)

(52) U.S. Cl.
CPC ............ *F16F 1/3876* (2013.01); *F16F 1/371* (2013.01)

(58) Field of Classification Search
CPC .. F16F 1/3863; F16F 1/38; F16F 1/371; F16F 1/373; F16F 1/3876
(Continued)

(56) References Cited

U.S. PATENT DOCUMENTS 3,147,963 A * 9/1964 Frazier ................. B60G 5/047
267/270
3,781,073 A * 12/1973 Jorn ....................... F16C 11/04
384/220
(Continued)

FOREIGN PATENT DOCUMENTS

CN  1603653  4/2005
CN  1752476  3/2006
(Continued)

OTHER PUBLICATIONS

International Search Report, Date of mailing: Jan. 14, 2014 (Jan. 14, 2014).
(Continued)

*Primary Examiner* — Anna Momper
*Assistant Examiner* — Mahbubur Rashid
(74) *Attorney, Agent, or Firm* — Rankin, Hill & Clark LLP

(57) ABSTRACT

The present invention provides a vibration-damping device having an inner cylinder, an outer cylinder arranged at a distance on an outer diameter side of the inner cylinder, a rubber elastic body interposed between the inner cylinder and the outer cylinder for elastically coupling the inner cylinder and the outer cylinder, and an intermediate plate embedded in the rubber elastic body. A plurality of cutout parts positioned on both end sides in the axial direction of the outer cylinder for joining an inner side rubber elastic body and an outer side rubber elastic body are formed in the intermediate plate. At least one of the cutout parts is arranged to overlap on an area that is sandwiched between two parallel imaginary planes that are adjacent to the outer peripheral surface of the inner cylinder.

14 Claims, 9 Drawing Sheets

(58) Field of Classification Search
USPC .................................................. 267/141.2
See application file for complete search history.

(56) References Cited

U.S. PATENT DOCUMENTS

| | | | | |
|---|---|---|---|---|
| 4,491,429 A * | 1/1985 | Matoba | ............ | B60G 7/00 267/154 |
| 4,667,943 A * | 5/1987 | Izumi | ............ | B60G 3/225 267/141.3 |
| 4,744,677 A * | 5/1988 | Tanaka | ............ | F16F 1/371 267/141 |
| 8,292,312 B2 * | 10/2012 | Kato | ............ | B60G 21/0551 267/141.1 |
| 8,505,889 B2 * | 8/2013 | Suzuki | ............ | B60G 3/20 267/141.1 |
| 2005/0153781 A1 * | 7/2005 | Buhl | ............ | F16F 1/3863 464/89 |
| 2007/0290425 A1 * | 12/2007 | Heuer | ............ | F16F 1/3814 267/293 |
| 2011/0291377 A1 * | 12/2011 | Kato | ............ | B60G 21/0551 280/124.107 |
| 2012/0074630 A1 * | 3/2012 | Kato | ............ | B60G 7/008 267/292 |
| 2015/0008630 A1 * | 1/2015 | Ishimatsu | ............ | F16F 1/3835 267/279 |

FOREIGN PATENT DOCUMENTS

| | | | | |
|---|---|---|---|---|
| CN | 101240827 | | 8/2008 | |
| DE | WO 2004025138 A1 * | | 3/2004 | ............ F16F 1/3863 |
| DE | EP 2023005 A2 * | | 2/2009 | ............ F16F 1/3863 |
| GB | 532393 A * | | 1/1941 | ............ B60G 17/02 |
| JP | H01-111835 | | 7/1989 | |
| JP | 05-248466 | | 9/1993 | |
| JP | H05-71479 | | 9/1993 | |
| JP | H06-22639 | | 3/1994 | |
| JP | H08-219210 A | | 8/1996 | |
| JP | WO 2008090594 A1 * | | 7/2008 | ............ B60G 3/20 |
| JP | 2012-72794 | | 4/2012 | |

OTHER PUBLICATIONS

Chinese Office Action dated Apr. 5, 2016 with English translation, 9 pages.

* cited by examiner

VIBRATION-DAMPING DEVICE

TECHNICAL FIELD

The present invention relates to a vibration-damping device having a rubber elastic body interposed between an inner cylinder and an outer cylinder, and the rubber elastic body having an intermediate member therein.

BACKGROUND ART

As vibration-damping devices of this type, rubber bushes have been known which are installed in suspension arms of a car. The rubber bush has an inner cylinder, an outer cylinder (attachment part) arranged at a distance on an outer diameter side of the inner cylinder, a rubber elastic body which elastically couples the inner cylinder and the outer cylinder mutually, and an intermediate member (sleeve) embedded in the rubber elastic body (for example, see Patent Document 1).

The rubber bushes receive loads which are applied to wheels in a front-back direction of the vehicle on attachment portions of the suspension arms at a vehicle body side. Therefore, the rubber elastic bodies elastically deform, which prevents the loads from being transferred from the wheels to the vehicle body.

PRIOR ART DOCUMENT

Patent Document

Patent Document 1: JP H08-219210 A

DISCLOSURE OF INVENTION

Problem to be Solved by the Invention

In case that an inner cylinder side of each rubber bush receives prying force from the wheel, spring force of the rubber elastic body increases. While, since a rubber width of the rubber elastic body on the inner cylinder side and a rubber width of the rubber elastic body on an outer cylinder side which are divided into two by the intermediate member (sleeve) are thin respectively, durability of the rubber elastic body may decrease.

Further, in case that the prying force is applied to the inner cylinder side, a deformation amount of the rubber elastic body becomes at the maximum at both end portions of the rubber elastic body in an axial direction of the inner cylinder. The portions having a large amount of deformation suffer aged deterioration more than other portions, and the durability tends to deteriorate.

In view of the problem above, it is an object of the present invention to provide a vibration-damping device which can restrain deformation with rubber volume of a rubber elastic body compared with a conventional manner and can improve durability.

Means for Solving the Problem

To solve the above problem, a vibration-damping device of the present invention has an inner cylinder, an outer cylinder arranged at a distance on an outer diameter side of the inner cylinder, a rubber elastic body that is interposed between the inner cylinder and the outer cylinder to couple the inner cylinder and the outer cylinder elastically, and an intermediate member that is embedded in the rubber elastic body, wherein the intermediate member has a plurality of cutout parts that position on both end sides in an axial direction of the outer cylinder and at which the rubber elastic body inside the intermediate member is joined with the rubber elastic body outside the intermediate member, and at least one of the plurality of cutout parts is arranged to overlap on an area that is sandwiched between two parallel imaginary planes adjacent to an outer circumference surface of the inner cylinder.

According to the present invention, the rubber elastic body inside the intermediate member and the rubber elastic body outside the intermediate member can be joined (coupled) via the cutout parts positioned on both the end sides in the axial direction of the outer cylinder. Therefore, compressive deformation occurred at both end portions in the axial direction of the rubber elastic body can be preferably restrained. Therefore, in case that prying force is applied, the invention can restrain the compressive deformation (deformation amount) of the rubber elastic body compared with a conventional manner, thereby improving durability. Consequently, the invention can downsize the vibration-damping device and can enhance vibration absorbability.

Further, the cutout part on one end side and the cutout part on the other end side of the plurality of cutout parts are preferably arranged in point symmetry positions having a center of the inner cylinder as a rotation center. With such an arrangement, coupling parts of the rubber elastic body inside the intermediate member and the rubber elastic body outside the intermediate member can be set in point symmetry positions, and the prying force applied to the inner cylinder can be preferably restrained.

Still further, the plurality of cutout parts are preferably arranged in positions to face mutually on one end side of the outer cylinder and are preferably arranged in positions to face mutually on the other end side of the outer cylinder. With such an arrangement, the coupling parts of the rubber elastic body inside the intermediate member and the rubber elastic body outside the intermediate member can be arranged to face mutually on one end side of the outer cylinder and can be arranged to face mutually on the other end side of the outer cylinder. Therefore, the compressive deformation can be further reduced and the durability can be improved.

Still further, the cutout part is preferably formed between projections adjacent to each other in a circumference direction of the intermediate member, and the projections are preferably arranged outside the area that is sandwiched between the two parallel imaginary planes adjacent to the outer circumference surface of the inner cylinder. With such an arrangement, the inner cylinder can be displaced without being disturbed by the projections which are arranged outside the area. Therefore, the prying force applied from the inner cylinder side via the rubber elastic body provided in the cutout parts can be preferably absorbed.

Still further, the intermediate member is formed with a single body or a plurality of divided bodies divided in a circumference direction. Therefore, the intermediate member can be easily formed.

Still further, a pair of reduced diameter parts is formed on the outer circumference surface of the inner cylinder. The pair of reduced diameter parts is covered with the rubber elastic body, respectively. Therefore, a free length in free extendable parts can be longer by a depth recessed toward the inner diameter side. Consequently, a movable space for the inner cylinder can be expanded and the prying force can be preferably restrained.

Moreover, a vibration-damping device of the present invention has an inner cylinder, an outer cylinder arranged at a distance on an outer diameter side of the inner cylinder, a rubber elastic body that is interposed between the inner cylinder and the outer cylinder to couple the inner cylinder and the outer cylinder elastically, and an intermediate member that is embedded in the rubber elastic body, wherein the rubber elastic body has a free extendable part that positions on both end sides in an axial direction of the outer cylinder and extends free length.

According to the invention, the free length of the rubber elastic body can be made longer by a width dimension of the intermediate member in the free length extendable part positioned on both the end sides in the axial direction of the rubber elastic body. Since the movable space for the inner cylinder is expanded in the free length extendable part, the compressive deformation can be preferably restrained and the durability can be improved. It is noted that the free length indicates a clearance in a radial direction between the inner cylinder and the outer cylinder.

Effect of the Invention

A vibration-damping device can be obtained which can restrain deformation with rubber volume of a rubber elastic body compared with a conventional manner and can improve durability in case that prying force is applied.

BEST MODE FOR CARRYING OUT THE INVENTION

Figure 1:
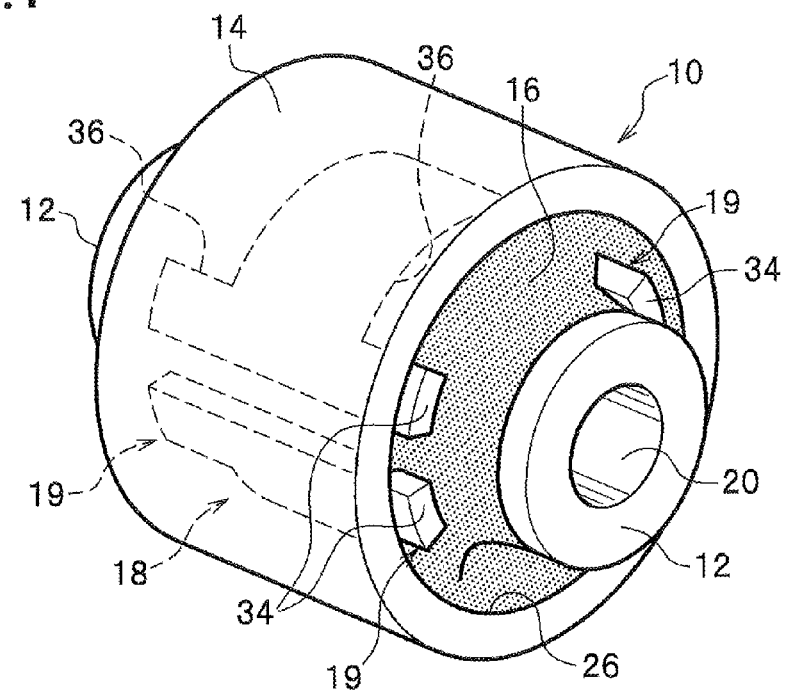
FIG. 1 is a perspective view of a rubber bush according to an embodiment of the present invention.

As shown in FIG. 1, a rubber bush 10 according to an embodiment of the present invention has an inner cylinder 12, an outer cylinder 14, a rubber elastic body 16 and an intermediate plate (intermediate member) 18.

Figure 4A:
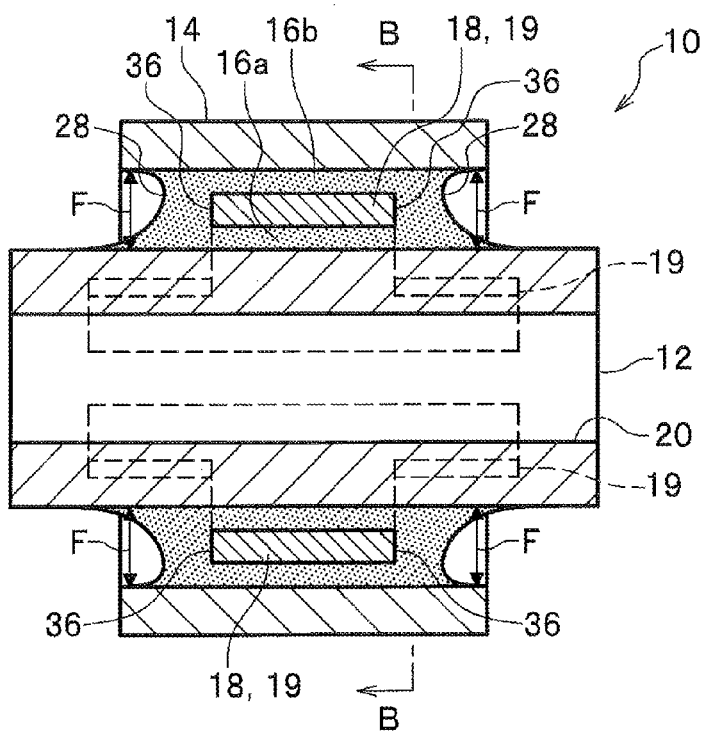
FIG. 4A is a cross sectional view in an axial direction along an A-A line in FIG. 2.

The inner cylinder 12 is a cylindrical body in which a through hole 20 is formed in an axial direction and which has a given thickness (see FIG. 4A). The inner cylinder 12 has the same outer diameter dimension from one end to the other end in the axial direction.

The outer cylinder 14 is arranged at a distance on an outer diameter side of the inner cylinder 12. The outer cylinder 14 is a cylindrical body in which a through hole 26 is formed in the axial direction and which is formed relatively thinner than the inner cylinder 12. Further, the outer cylinder 14 is formed shorter than the inner cylinder 12 in the axial direction by a predetermined length (see FIGS. 3A and 3B).

Figure 4B:
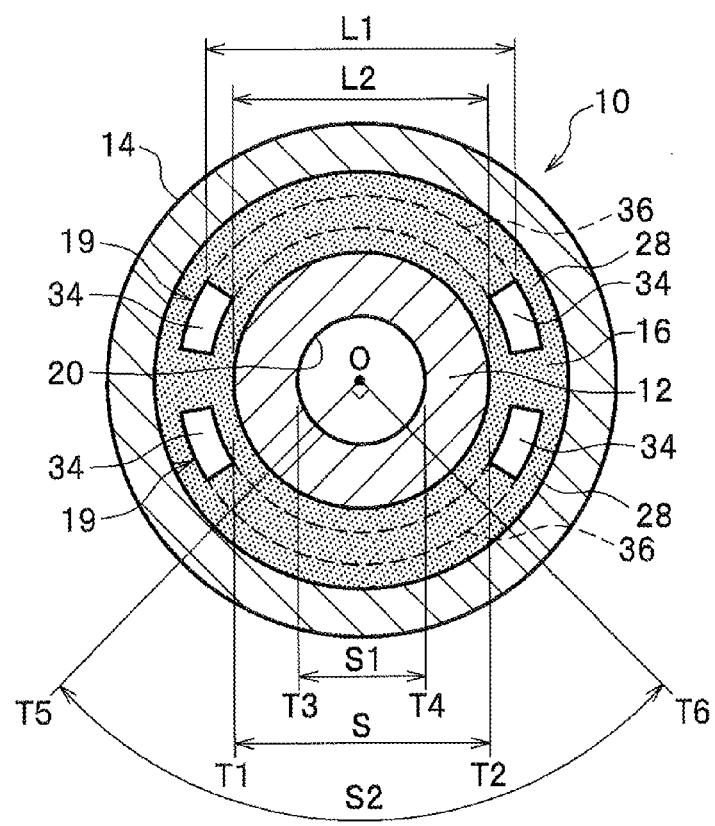
FIG. 4B is a cross sectional view in a direction orthogonal to an axis along a B-B line in FIG. 4A.

As shown in FIGS. 4A and 4B, the rubber elastic body 16 is interposed between the inner cylinder 12 and the outer cylinder 14 to couple them elastically. For example, molten rubber is injected between the inner cylinder 12 and the outer cylinder 14 set in a metal mould (not shown), which allows the rubber elastic body 16 to vulcanizedly adhere to an outer circumference surface of the inner cylinder 12 and an inner circumference surface of the outer cylinder 14. Further, the rubber elastic body 16 includes free extendable parts 28 (see FIG. 4A). The free extendable parts 28 will be explained in detail later.

The intermediate plate 18 is embedded in the rubber elastic body 16. The intermediate plate 18 enables a thickness of an inner side rubber elastic body 16a between the intermediate plate 18 and the inner cylinder 12 and a thickness of an outer side rubber elastic body 16b between the intermediate plate 18 and the outer cylinder 14 to be thinner respectively than a case where the intermediate plate 18 is not provided. Consequently, a spring constant in a direction orthogonal to the axis of the inner cylinder 12 can be enhanced. Further, twisting force between the inner cylinder 12 and the outer cylinder 14 can be restrained.

Figure 5:
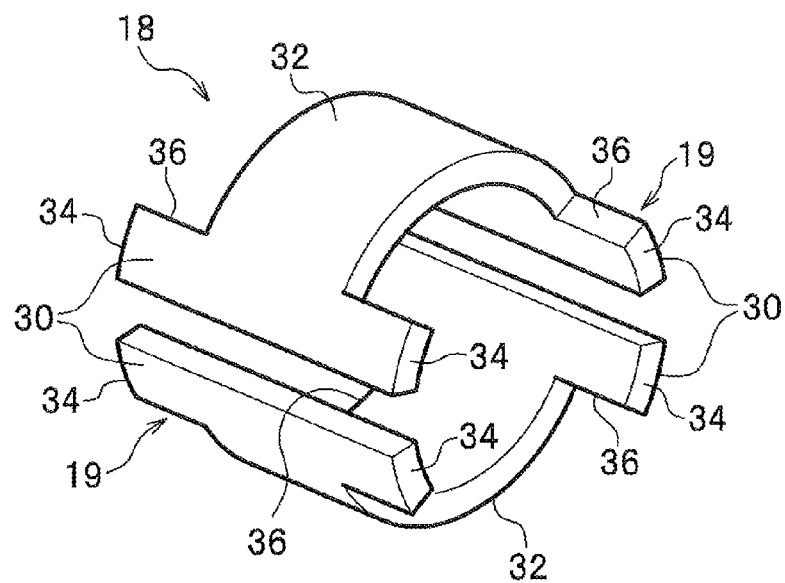
FIG. 5 is a perspective view of divided bodies forming an intermediate plate.

The intermediate plate 18 is arranged between the inner cylinder 12 and the outer cylinder 14. As shown in FIG. 5, the intermediate plate 18 of the embodiment is formed with two divided bodies 19 having the same shape. The two divided bodies 19 are arranged to face with each other having the inner cylinder 12 (not shown) therebetween. Each divided body 19 is formed in an approximately H-shape in planar view (see FIG. 3A). The divided body 19 has belt-like parts 30, 30 extending in a strip shape in the axial direction of the inner cylinder 12 and a joining part 32 having an arc shape in a cross section which extends in a direction orthogonal to axes of the belt-like parts 30 to join the belt-like parts 30, 30 together. The joining part 32 is completely embedded in the rubber elastic body 16 and is not exposed to an outside of the rubber elastic body 16.

One end portion and the other end portion of the belt-like part 30 have projections 34 which are not covered with the rubber elastic body 16 and project toward an outside. The projections 34 form one end portion and the other end portion of the intermediate plate 18 in the axial direction. Further, the projections 34 function as holding and fixing parts to hold and fix the intermediate plate 18 when the intermediate plate 18 is set in a cavity of a metal mould (not shown).

Each divided body 19 has cutout parts 36 which position on both end sides in the axial direction of the outer cylinder 14 and at which the inner side rubber elastic body 16a (rubber elastic body at the inner side) is joined with the outer side rubber elastic body 16b (rubber elastic body at the outer side). The cutout parts 36 provided on both the end sides of the divided body 19 make rubber volume of the rubber elastic body 16 increase compared with a conventional manner, and the inner side rubber elastic body 16a is coupled (joined) with the outer side rubber elastic body 16b at both the end portions in the axial direction of the rubber elastic body 16. Gaps formed between the belt-like parts 30 of one divided body 19 and the band-like parts 30 of the other divided body 19 are not regarded as the cutout parts 36.

Parts of the rubber elastic body 16 corresponding to the cutout parts 36 are the free extendable parts 28. The inner side rubber elastic body 16a is continuous to the outer side rubber elastic body 16b in the free extendable parts 28. The inner side rubber body 16a is not separated from the outer side rubber elastic body 16b by the intermediate plate 18 in the free extendable parts 28. Shortly, the free extendable parts 28 are formed with only rubber without the intermediate plate 18. The free extendable parts 28 position on both the end sides in the axial direction of the rubber elastic body 16 and adhere to the outer circumference surface of the inner cylinder 12 and to the inner circumference surface of the outer cylinder 14.

A clearance between the outer circumference surface of the inner cylinder 12 and the inner circumference surface of the outer cylinder 14 is regarded as a free length F in the free extendable parts 28. Thus, the free length F can be made longer by a width dimension of the intermediate plate 18 compared with a conventional manner. Since parts other than the free extendable parts 28 are separated by the intermediate plate 18, the free length thereof is shorter than the free length F. In other words, the "free length" refers to a space where the rubber elastic body 16 can move between the inner cylinder 12 and the outer cylinder 14 at both the end portions in the axial direction of the rubber elastic body 16. The free length further refers to the clearance in a radial direction between the outer diameter of the inner cylinder 12 and the inner diameter of the outer cylinder 14 (see FIG. 4A).

A plurality of cutout parts 36 formed in the two divided bodies 19 respectively are arranged to overlap on an area S sandwiched between two parallel imaginary planes T1, T2 adjacent to the outer circumference surface of the inner cylinder 12 (see FIG. 4B). For example, the two cutout parts 36, 36 appear in a vertical cross section orthogonal to the axial direction. In case that the two parallel imaginary planes T1, T2 adjacent to the outer circumference surface of the inner cylinder 12 are set, the two cutout parts 36, 36 intersect with (overlap on) the area S sandwiched between the two imaginary planes T1, T2.

As a positional relation between the area S and the cutout parts 36, the whole cutout parts 36 may position within the area S sandwiched between the imaginary planes T1, T2. Further, for example, the cutout parts 36 may occupy the whole area S and a portion of the cutout parts 36 may extend beyond the area S. Shortly, at least a portion of the cutout parts 36 may preferably position in the area S (in other words, a portion of the projections 34 may be within the area S). Still further, in the embodiment, both the two cutout parts 36, 36 are arranged to overlap on the area S, but at least one cutout part 36 may preferably be arranged to overlap on the area S sandwiched between the imaginary planes T1, T2.

Further, as shown in FIG. 4B, both the two cutout parts 36, 36 may be arranged to be included in an area S1 sandwiched between two parallel imaginary planes T3, T4 adjacent to the inner circumference surface of the inner cylinder 12. In other words, the projections 34 may be extended just before the area S1, or a portion of the projections 34 may be formed to extend into the area S1. Still further, both the two cutout parts 36, 36 may be arranged to be included in an area S2 sandwiched between two parallel imaginary planes T5, T6 which pass through a center O of the inner cylinder 12 and are orthogonal to each other. In other words, the projections 34 may be extended just before the area S2, or a portion of the projections 34 may be formed to extend into the area S2. Shortly, each cutout part 36 may be formed with increased rubber volume of the rubber elastic body 16 such as to acquire a desired restrictive effect for compressive deformation compared with a conventional manner.

Figure 7:
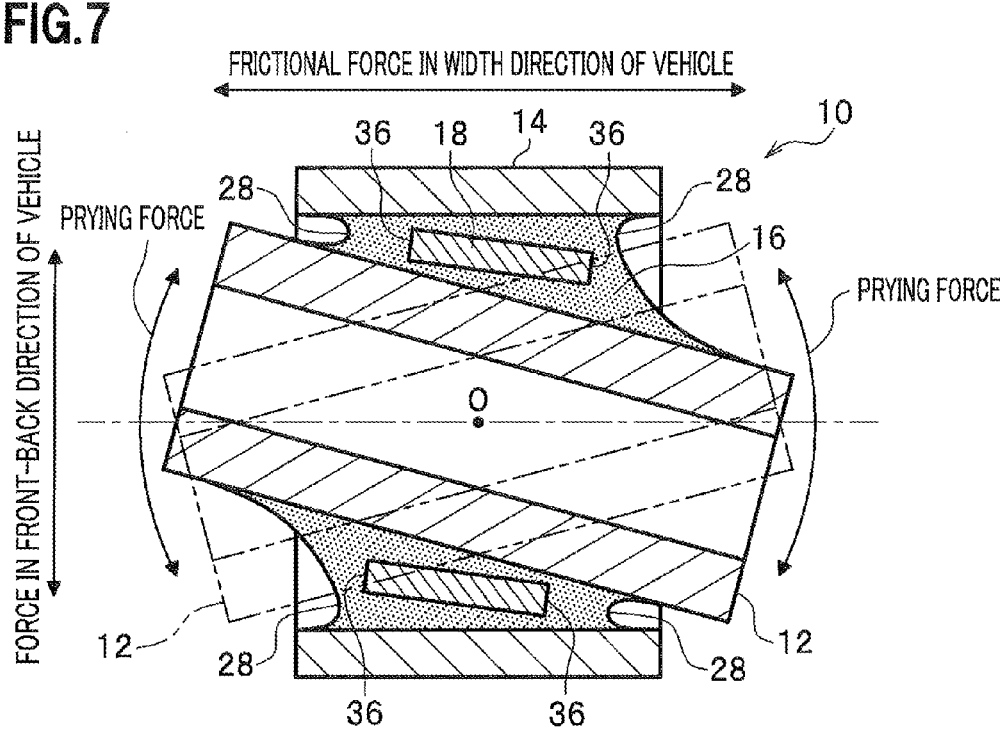
FIG. 7 is an explanatory view showing displacement of an inner cylinder when prying force is applied thereto.

Still further, the plurality of cutout parts 36, which are the cutout part 36 on one end side and the cutout part 36 on the other end side in the axial direction, are arranged in point symmetrically positions to the center O of the inner cylinder 12 (see FIG. 4B and FIG. 7) as a rotation center (see FIG. 4A and FIG. 7). In other words, the cutout part 36 formed in one divided body 19 on one end side and the cutout part 36 formed in the other divided body 19 on the other end side in the axial direction of the outer cylinder 14 are arranged in point symmetry positions having the center O of the inner cylinder 12 as the rotation center. The arrangement of the cutout parts 36 in point symmetry positions on one end side and on the other end side enables the coupling parts (free extendable parts 28) of the inner side rubber elastic body 16a and the outer side rubber elastic body 16b to be arranged in point symmetry positions. Consequently, prying force applied to the inner cylinder 12 can be preferably restrained.

Figure 2:
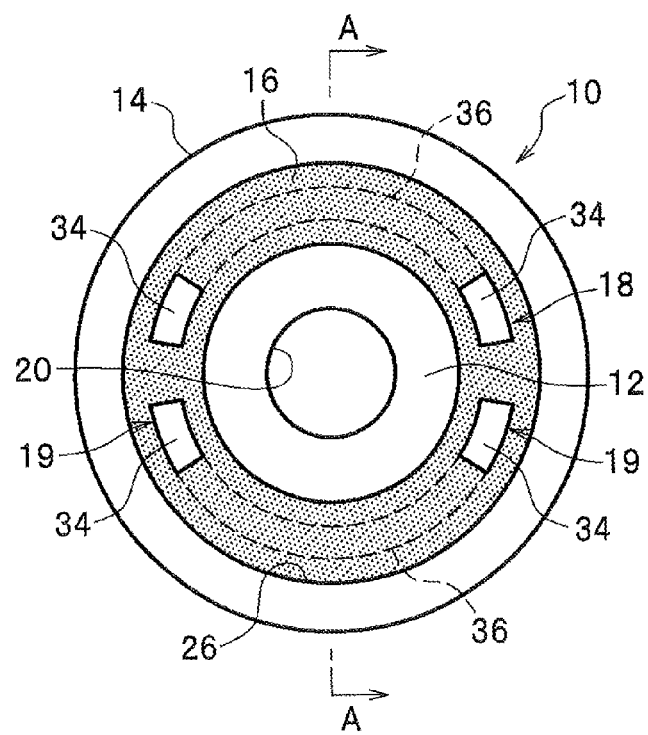
FIG. 2 is a front view of the rubber bush shown in FIG. 1.
Figure 3A:
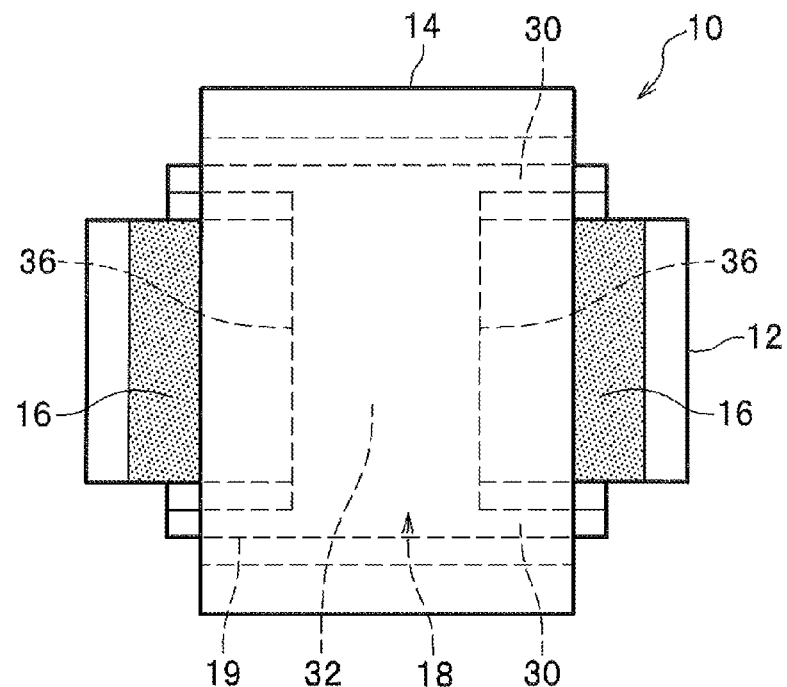
FIG. 3A is a plan view of the rubber bush shown in FIG. 1.
Figure 3B:
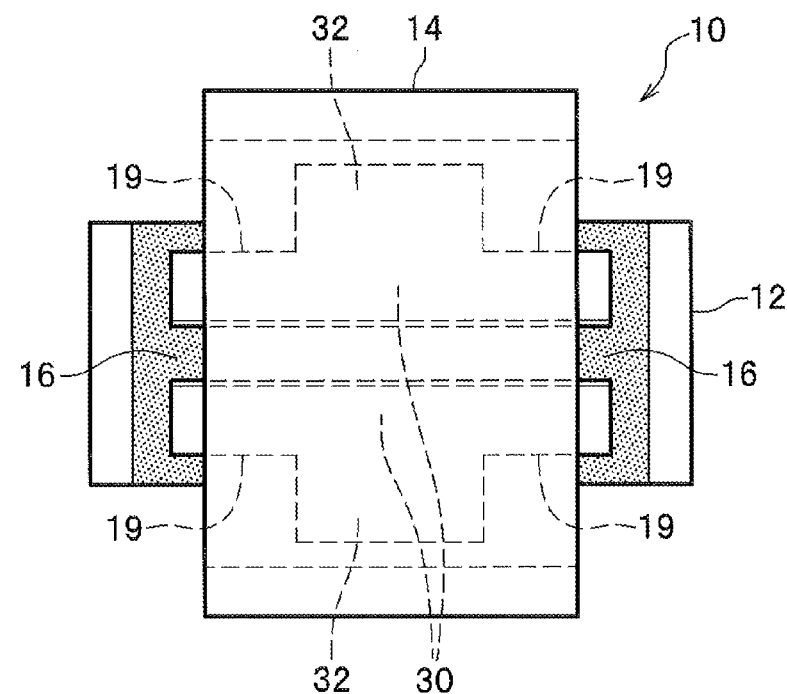
FIG. 3B is a side view of the rubber bush shown in FIG. 1.

Still further, the plurality of cutout parts 36 formed in the two divided bodies 19 respectively are arranged in mutually opposed positions on one end side and the other end side in the axial direction of the outer cylinder 14 (see FIG. 2 and FIG. 3A). Shortly, on one end side (or the other end side) in the axial direction of the outer cylinder 14, the cutout part 36 formed in one divided body 19 and the cutout part 36 formed in the other divided body 19 are arranged in mutually opposed positions in the radial direction. Each cutout part 36 is formed to have an approximately rectangular shape in planar view (see FIG. 3A), but the shape thereof is not limited thereto as described later.

Still further, the cutout parts 36 are formed between the projections 34 which are adjacent to each other in a circumferential direction of the intermediate plate 18 (see FIG. 5), and the projections 34 are arranged outside the area S sandwiched between the two imaginary planes T1, T2. Shortly, as shown in FIG. 4B, the arrangement of the projections 34 outside the area S sandwiched between the two imaginary planes T1, T2 allows a width dimension (L1) when the cutout parts 36 are projected on a surface vertical to the imaginary planes T1, T2 (surface orthogonal to the drawing sheet) to be set at a length equal to or longer than an outer diameter (L2) of the inner cylinder 12 (L1≥L2).

The rubber bush 10 according to the embodiment is basically formed as described above. The operation and the effect thereof will be explained below.

For example, when a vehicle runs on a winding road such as a curved road, the prying force is generated. The prying force is caused by driving force in a front-back direction of the vehicle and frictional force in a width direction of the vehicle from the road which opposes centrifugal force (see FIG. 7). The prying force makes the inner cylinder 12 swing in arrow directions shown in FIG. 7, which compressively deforms both the end sides of the rubber elastic body 16 interposed between the inner cylinder 12 and the outer cylinder 14.

In the embodiment, the plurality of cutout parts 36 formed in the two divided bodies 19 respectively are arranged to overlap on the area S sandwiched between the two parallel imaginary planes T1, T2 adjacent to the outer circumference surface of the inner cylinder 12 (see FIG. 4B). This arrangement allows the inner side rubber elastic body 16a and the outer side rubber elastic body 16b to be joined (coupled) via cutout parts 36 formed in the divided bodies 19 so as to form the free extendable parts 28. The formation of the free extendable parts 28 can secure a deformation margin of the rubber elastic body 16. In addition, the compressive deformation occurred on both the end sides in the axial direction of the rubber elastic body 16 can be preferably restrained. Therefore, in the embodiment, when the prying force is applied, the compressive deformation (deformation amount) of the rubber elastic body 16 can be restrained compared with a conventional manner, resulting in durability improvement. Consequently, in the embodiment, the rubber bush 10 can be downsized and vibration absorbability can be improved.

In other words, in the embodiment, the free length F can be made longer by a thickness dimension of the intermediate plate 18 in the free extendable parts 28 positioned on both the end sides in the axial direction of the rubber elastic body 16. Since the inner cylinder 12 can have an extended movable space in the free extendable parts 28, the compressive deformation can be preferably restrained and durability can be improved. Consequently, in the embodiment, the rubber bush 10 can be downsized and vibration absorbability can be improved.

Further, in the embodiment, the cutout part 36 formed in one divided body 19 on one end side and the cutout part 36 formed in the other divided body 19 on the other end side in the axial direction of the outer cylinder 14 are arranged in point symmetry positions having the center O of the inner cylinder 12 as the rotation center. Thus, the arrangement of the cutout parts 36 in point symmetry positions on one end side and the other end side allows the coupling parts (free extendable parts 28) of the inner side rubber elastic body 16a and the outer side rubber elastic body 16b to be arranged in point symmetry positions. Consequently, in the embodiment, the prying force applied to the inner cylinder 12 can be preferably restrained.

Still further, in the embodiment, the arrangements of the cutout parts 36 in positions to face to each other on one end side and of the cutout parts 36 in positions to face to each other on the other end side in the axial direction of the outer cylinder 14 can further reduce the compressive deformation and can improve durability.

Yet further, in the embodiment, the intermediate plate 18 is formed with the two divided bodies 19, by which the divided bodies 19 can be formed easily. Three or more divided bodies may form the intermediate plate 18 (not shown).

Figure 6:
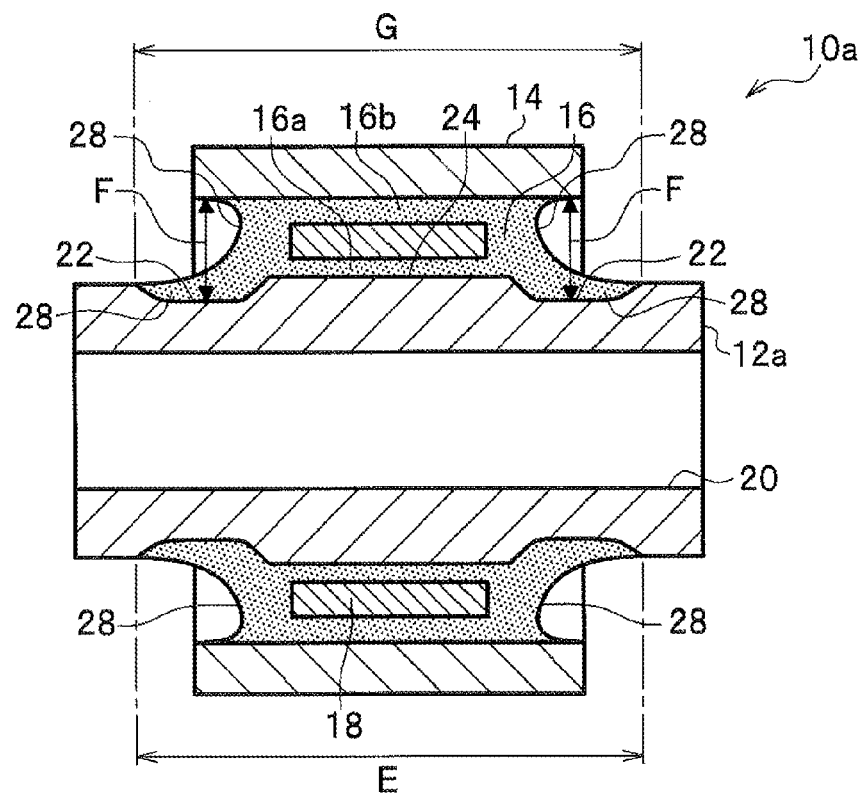
FIG. 6 is a cross sectional view in the axial direction of the rubber bush according to a modification of FIG. 1.

Moreover, in the embodiment, the inner cylinder 12 is set to have the same outer diameter in the entire length (see FIG. 4A), but the invention is not limited thereto. For example, as shown in FIG. 6, a pair of reduced diameter parts 22, 22 may be provided on the outer circumference surface of the inner cylinder 12a. The pair of reduced diameter parts 22, 22 is continuous in a circumference direction of the inner cylinder 12a.

A rubber bush 10a according to a modification shown in FIG. 6 has the pair of reduced diameter parts 22, 22 on the outer circumference surface on both the end sides in the axial direction of the inner cylinder 12a. The reduced diameter parts 22, 22 are recessed toward an inner diameter side of the inner cylinder 12a compared with the other circumference surface. An enlarged diameter part 24 is provided between the pair of reduced diameter parts 22, 22. The enlarged diameter part 24 enlarges outwardly in a radial direction compared with the other outer circumference surface. The pair of reduced diameter parts 22, 22 is covered with the rubber elastic body 16, respectively. The length E from one reduced diameter part 22 to the other reduced diameter part 22 in the axial direction is set to approximately the same length as a width dimension G in the axial direction of the rubber elastic body 16 (E≈G).

Thus, the pair of reduced diameter parts 22 is provided on the outer circumference surface of the inner cylinder 12a and is covered with the rubber elastic body 16. Therefore, the free length F of the free extendable parts 28 can be made longer by a depth recessed toward the inner diameter side. Consequently, the prying force can be preferably restrained with the more increased movable space for the inner cylinder 12a.

The embodiment is explained as an example in which the invention is applied to the rubber bush 10 installed in a suspension, but the invention is not limited thereto. For example, the invention can also be applied to an engine mount, a liquid seal engine mount and the like.

Next, a rubber bush 100 according to another embodiment of the invention will be explained. In the embodiment shown below, the same structure elements are labeled with the same reference numbers and the explanations thereof will be omitted. Only different structure elements will be explained in detail hereinbelow.

Figure 8:
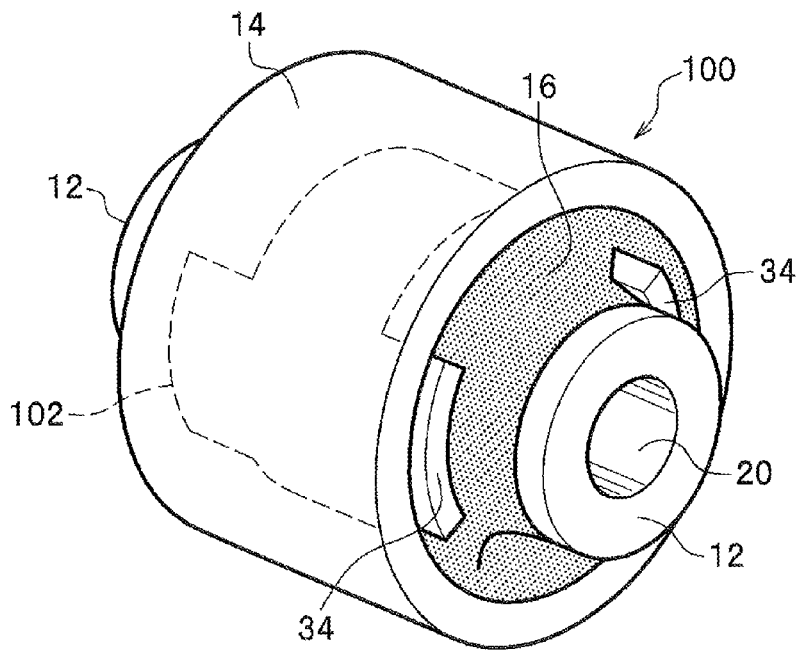
FIG. 8 is a perspective view of the rubber bush according to another embodiment of the present invention.
Figure 9A:
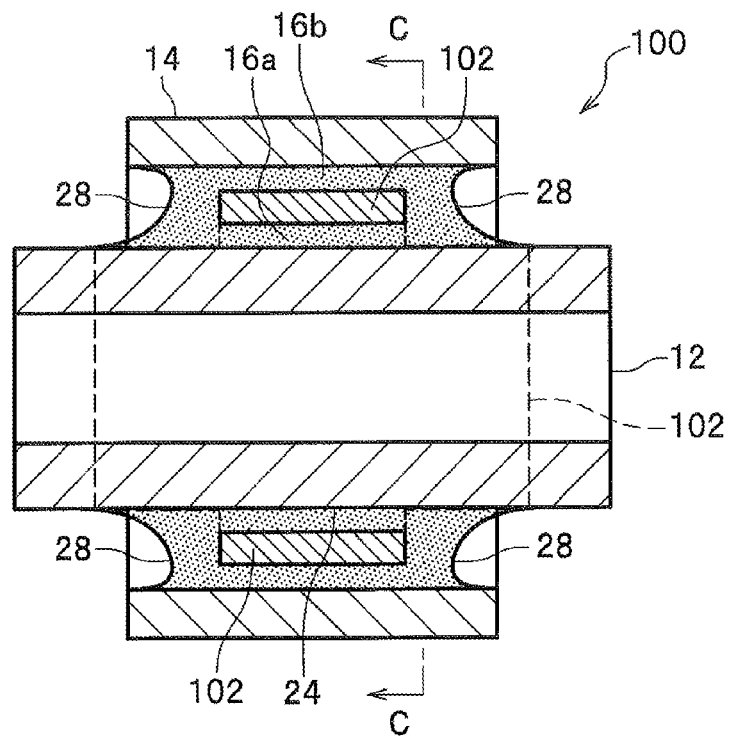
FIG. 9A is a cross sectional view in the axial direction corresponding to FIG. 4A.
Figure 9B:
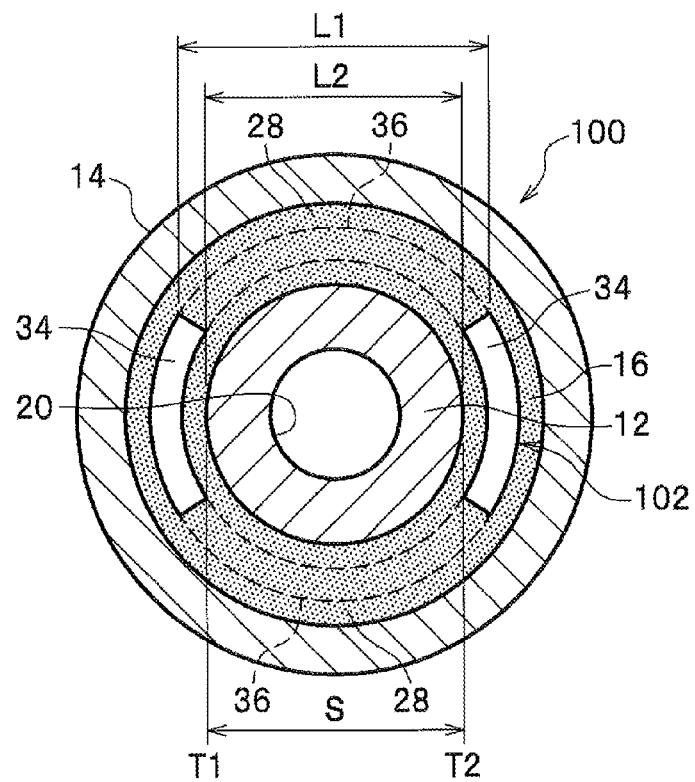
FIG. 9B is a cross sectional view in a direction orthogonal to the axis along a C-C line in FIG. 9A.
Figure 10:
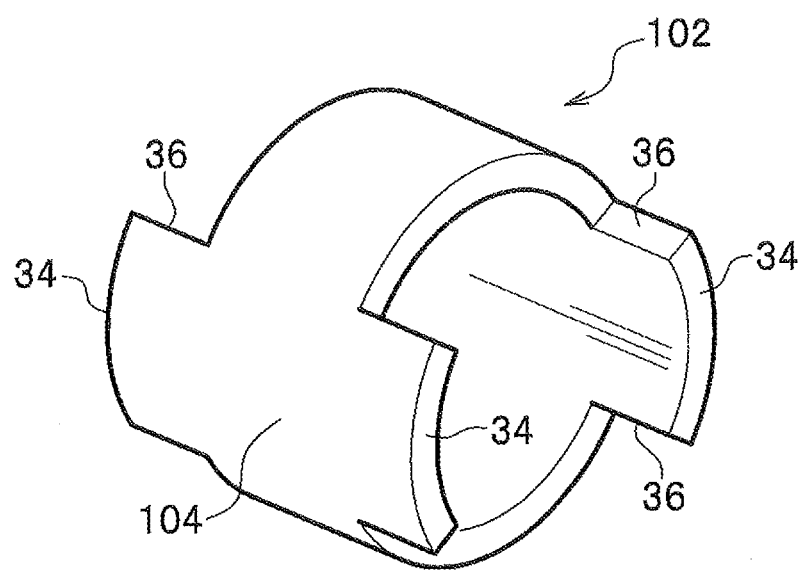
FIG. 10 is a perspective view of the intermediate plate formed with a single cylindrical body.

FIG. 8 is a perspective view of the rubber bush according to another embodiment of the present invention, FIG. 9A is a cross sectional view in the axial direction corresponding to FIG. 4A, FIG. 9B is a cross sectional view in the direction orthogonal to the axis along a C-C line in FIG. 9A, and FIG. 10 is a perspective view of the intermediate plate formed with a single cylindrical body.

The rubber bush 100 according to another embodiment shown in FIG. 8 is different from the rubber bush 10 shown in FIG. 1 as follows. An intermediate plate 102 of the rubber bush 100 in FIG. 8 is formed with a single cylindrical body (single body) while the intermediate plate 18 of the rubber bush 10 in FIG. 1 is formed with the divided bodies 19. The intermediate plate 102 has a cylindrical plate main body 104 and projections 34 which project from the plate main body 104 in the axial direction. In another embodiment, the intermediate plate 102 is formed with the single cylindrical body, by which positioning thereof in a cavity of a metal mould (not shown) and management therefor can be easier. Since other effects are the same as those of the embodiment described above, detailed explanations thereof will be omitted.

Figure 11A:
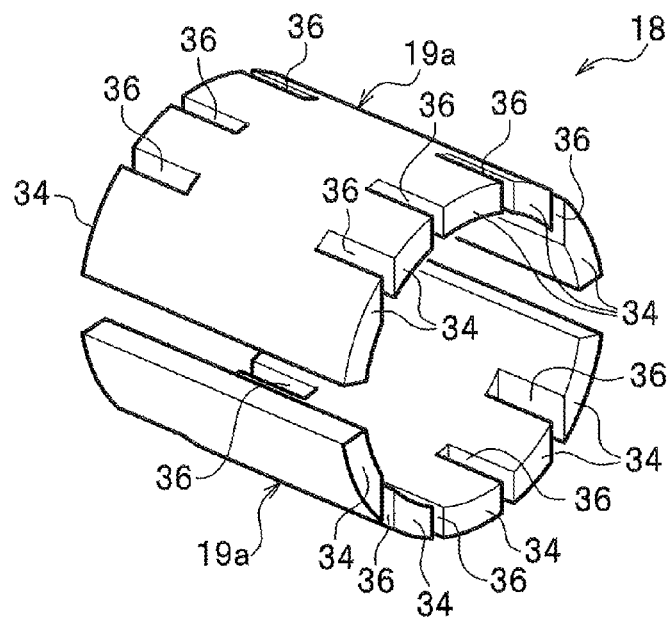
FIG. 11A is a perspective view of the intermediate plate forming the rubber bush according to the other embodiment.
Figure 11B:
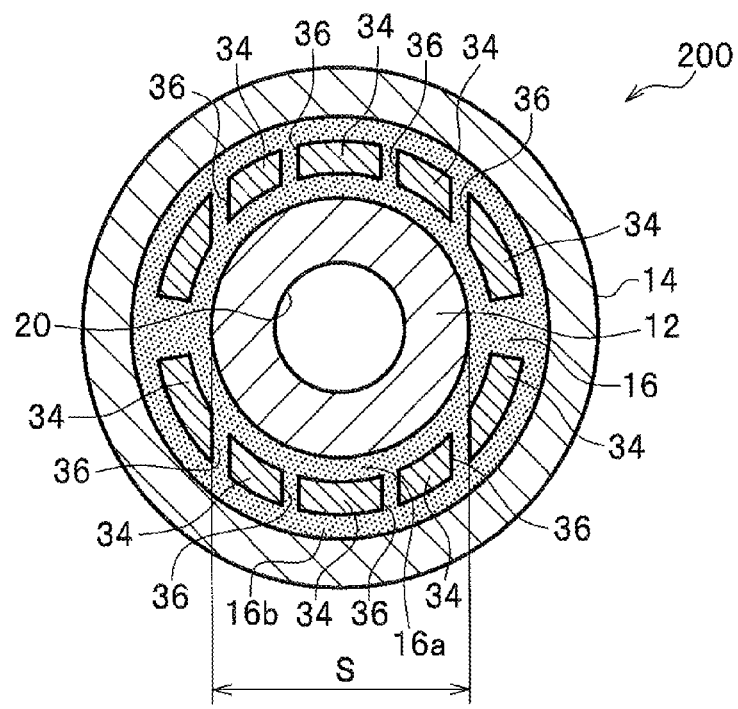
FIG. 11B is a cross sectional view in a direction orthogonal to the axis of the rubber bush.

FIG. 11A is a perspective view of the intermediate plate included in the rubber bush according to the other embodiment and FIG. 11B is a cross sectional view in the direction orthogonal to the axis of the rubber bush according to the other embodiment.

A rubber bush 200 according to the other embodiment is different from the rubber bush 10 shown in FIG. 1 as follows. Each divided body 19a forming the intermediate plate 18 of the rubber bush 200 has a plurality of cutout parts 36 (four in FIGS. 11A and 11B) while each divided body 19 has the single cutout part 36 formed on one end side and the other end side in the axial direction of the divided body 19 in the rubber bush 10. In this case, as shown in FIG. 11B, the plurality of cutout parts 36 formed in one divided body 19a are arranged to overlap on the area S sandwiched between the two parallel imaginary planes T1, T2 adjacent to the outer circumference surface of the inner cylinder 12.

The intermediate plate 18 shown in FIG. 11A is formed with the two divided bodies 19a, but may be formed with a single cylindrical body formed with eight cutout parts 36 in total on one side or the other side in the axial direction.

Figure 12A:
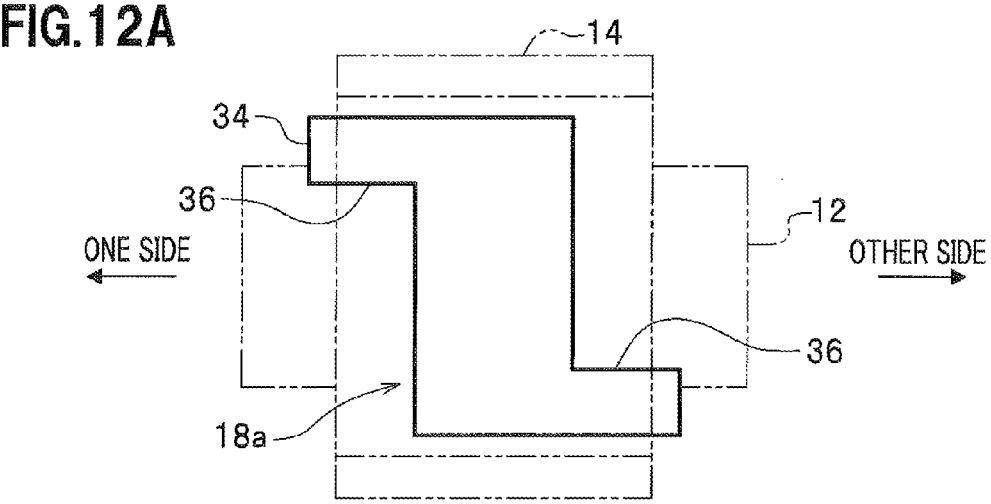
FIGS. 12A to 12C are plan views showing modifications of the intermediate plate.
Figure 12B:
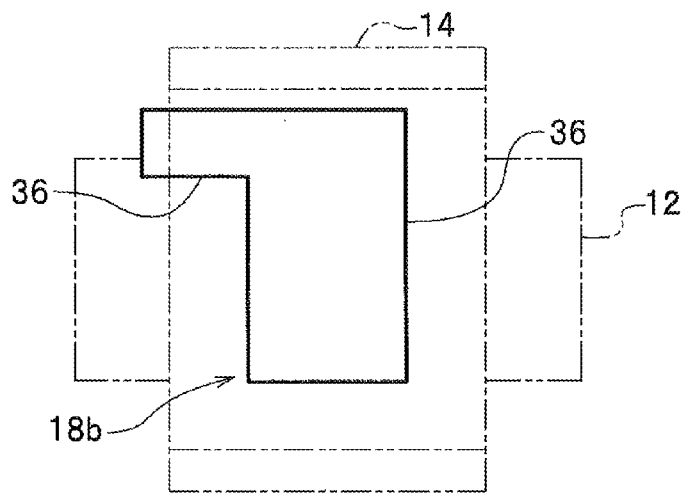
Figure 12C:
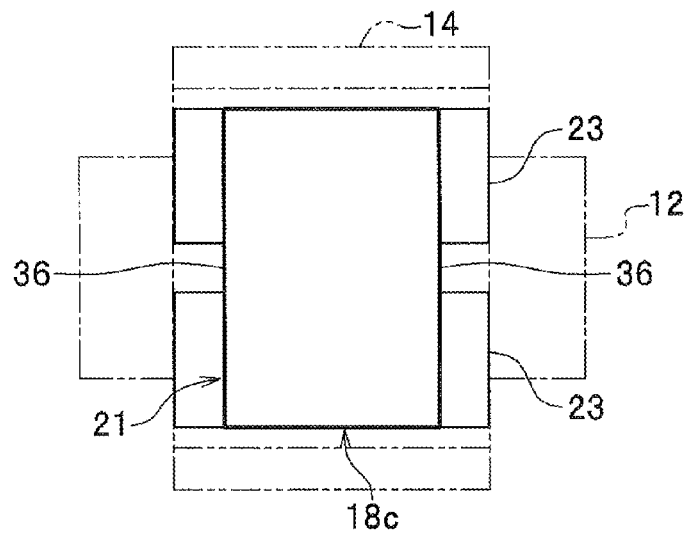

Next, modifications of the intermediate plate 18 will be shown in FIGS. 12A to 12C.

An intermediate plate 18a according to a first modification shown in FIG. 12A is different from the intermediate plate 18 (see FIG. 3A) formed in an H-shape in planar view as follows. The intermediate plate 18a is formed not to have the projection 34 on one side nor the projection 34 on the other side located diagonally with respect to the projection 34 on one side. In case that the intermediate plate 18a is inserted in a cavity of a metal mould (not shown) for vulcanized adhesion, the intermediate plate 18a is fixed at two points formed with the diagonally positioned pair of projections 34 in an up-down direction.

An intermediate plate 18b according to a second modification as shown in FIG. 12B is different from the intermediate plate 18a according to the first modification as follows. The intermediate plate 18b has the projection 34 on one side as it is of the pair of projections 34, 34 located diagonally in the intermediate plate 18a according to the first modification. Further, the intermediate plate 18b does not have the projection 34 on the other side. When the intermediate plate 18b is vulcanizedly adhered, the intermediate plate 18b is cantilevered with the remaining projection 34 on one side.

An intermediate plate 18c according to a third modification shown in FIG. 12C is formed with an intermediate plate main body 21 of a cylindrical body and a pair of fixing tools 23 attached thereto. The intermediate plate 18c attached with the fixing tools 23 is inserted in a cavity of a metal mould to be vulcanizedly adhered.

The intermediate plate 18a according to the first modification and the intermediate plate 18b according to the second modification may be formed with either a single body or a plurality of divided bodies, respectively.

DESCRIPTION OF REFERENCE NUMERALS

10, 10a, 100, 100a, 200 rubber bush (vibration damping device)
12, 12a inner cylinder
14 outer cylinder
16 rubber elastic body
16a inner side rubber elastic body (rubber elastic body on an inner side)
16b outer side rubber elastic body (rubber elastic body on an outer side)
18, 18a-18c, 102 intermediate plate (intermediate member)
19, 19a divided body
22 reduced diameter part
28 free extendable part
36 cutout part
S, S1, S2 area
T1-T6 imaginary plane
L1 width dimension when the cutout parts are projected on a surface vertical to the imaginary plane
L2 outer diameter of the inner cylinder
O center of the inner cylinder
F free length

The invention claimed is:

1. A vibration-damping device comprising:
    an inner cylinder;
    an outer cylinder arranged at a distance on an outer diameter side of the inner cylinder;
    a rubber elastic body that is interposed between the inner cylinder and the outer cylinder to couple the inner cylinder and the outer cylinder elastically; and
    an intermediate member that is embedded in the rubber elastic body,
    wherein
    the intermediate member has a plurality of cutout parts that position on both end sides in an axial direction of the outer cylinder and at which the rubber elastic body inside the intermediate member is joined with the rubber elastic body outside the intermediate member, the intermediate member further has belt parts and a joining part having a plurality of projections forming one end portion and another end portion of the intermediate member in the axial direction, a thickness of the joining part is equal to a thickness of the projections in a radial direction,
    at least one of the plurality of cutout parts is arranged to overlap a first area between two parallel imaginary planes each tangentially extending from opposite points on an outer circumference surface of the inner cylinder and to overlap a second area between two imaginary planes that pass through a center of the inner cylinder and are orthogonal to each other,
    a cross-sectional shape of the projections in a direction orthogonal to the axial direction follows a cross-sectional shape of the cutout parts,
    the projections are located outside the first area and the second area, and project outward in the axial direction with respect to end surfaces of the outer cylinder, and
    a thickness of an inner side rubber elastic body between the inner cylinder and the intermediate member is equal to a thickness of an outer side rubber elastic body between the outer cylinder and the intermediate member.

2. The vibration-damping device according to claim 1, wherein a cutout part on one end side and a cutout part on the other end side of the plurality of cutout parts are arranged in point symmetry with respect to a center of the inner cylinder.

3. The vibration-damping device according to claim 1, wherein the plurality of cutout parts are arranged in positions to face mutually on one end side of the outer cylinder and are arranged in positions to face mutually on another end side of the outer cylinder.

4. The vibration-damping device according claim 1, wherein
    the cutout part is formed between the projections adjacent to each other in a circumference direction.

5. The vibration-damping device according to claim 1, wherein the intermediate member is a single body or a plurality of divided bodies that are divided in a circumference direction.

6. The vibration-damping device according to claim 1, wherein the outer circumference surface of the inner cylinder has a pair of reduced diameter parts that is recessed toward an inner diameter side compared with other outer diameter surface.

7. The vibration-damping device according to claim 6, wherein each of the pair of reduced diameter parts is covered with the rubber elastic body.

8. The vibration-damping device according to claim 2, wherein
    the cutout part is formed between the projections adjacent to each other in a circumference direction.

9. The vibration-damping device according to claim 3, wherein the cutout part is formed between the projections adjacent to each other in a circumference direction.

10. The vibration-damping device according to claim 1, wherein the intermediate member has a rectangular shape in cross section where a length of an outer circumference surface in an axial direction is equal to a length of an inner circumference surface of the intermediate member.

11. The vibration-damping device according to claim 1, wherein the projections are located entirely outside the first area and the second area.

12. A vibration-damping device comprising:
an inner cylinder;
an outer cylinder arranged at a distance on an outer diameter side of the inner cylinder;
a rubber elastic body that is interposed between the inner cylinder and the outer cylinder to couple the inner cylinder and the outer cylinder elastically; and
an intermediate member that is embedded in the rubber elastic body, wherein
the intermediate member has a plurality of cutout parts that position on both end sides in an axial direction of the outer cylinder and at which the rubber elastic body inside the intermediate member is joined with the rubber elastic body outside the intermediate member, the intermediate member further has belt parts and a joining part having a plurality of projections forming one end portion and another end portion of the intermediate member in the axial direction, a thickness of the joining part is equal to a thickness of the projections in a radial direction,
at least one of the plurality of cutout parts is arranged to overlap a first area between two parallel imaginary planes each tangentially extending from opposite points on an outer circumference surface of the inner cylinder and to overlap a second area between two imaginary planes that pass through a center of the inner cylinder and are orthogonal to each other,
a cross-sectional shape of the projections in a direction orthogonal to the axial direction follows a cross-sectional shape of the cutout parts,
the projections are located outside the first area and the second area, and project outward in the axial direction with respect to end surfaces of the outer cylinder,
the rubber elastic body has a free extendable part that positions on both end sides in an axial direction of the outer cylinder and extends free length, and
a thickness of an inner side rubber elastic body between the inner cylinder and the intermediate member is equal to a thickness of an outer side rubber elastic body between the outer cylinder and the intermediate member.

13. The vibration-damping device according to claim 12, wherein the intermediate member has a rectangular shape in cross section where a length of an outer circumference surface in an axial direction is equal to a length of an inner circumference surface of the intermediate member.

14. The vibration-damping device according to claim 12, wherein the projections are located entirely outside the first area and the second area.

* * * * *